United States Patent [19]

Williamitis

[11] 4,042,248

[45] Aug. 16, 1977

[54] HIGH PRESSURE SHAFT SEALS

[75] Inventor: Victor A. Williamitis, Kettering, Ohio

[73] Assignee: General Motors Corporation, Detroit, Mich.

[21] Appl. No.: 723,763

[22] Filed: Sept. 16, 1976

[51] Int. Cl.$^2$ .............................................. F16J 15/32
[52] U.S. Cl. .................................... 277/138; 308/111; 308/125; 277/134; 277/152
[58] Field of Search ................... 277/134, 94, DIG. 6, 277/138, 215, 143, 152, 144, 153; 308/36.3, 102, 111, 125, 187.1

[56] References Cited

U.S. PATENT DOCUMENTS

| | | | |
|---|---|---|---|
| 2,245,475 | 6/1941 | Hately | 277/94 X |
| 2,630,356 | 3/1953 | Johnson | 308/187.1 |
| 2,804,325 | 8/1957 | Riesing | 277/153 |
| 3,464,709 | 9/1969 | Furgason et al. | 277/233 X |
| 3,801,114 | 4/1974 | Bentley | 277/134 |
| 3,857,156 | 12/1974 | Clark | 277/134 X |
| 3,929,341 | 12/1975 | Clark | 277/134 |
| 3,932,006 | 1/1976 | Tertinek et al. | 308/187.1 X |
| 3,938,813 | 2/1976 | Forch | 277/134 X |
| 3,973,781 | 8/1976 | Grorich | 277/153 X |

Primary Examiner—Robert S. Ward, Jr.
Attorney, Agent, or Firm—Edward P. Barthel

[57] ABSTRACT

A shaft seal structure located in the annular space between a pump housing and a relatively rotatable shaft. The seal includes an outer cup member, a plurality of intermediate plastic washers, an inner spring disc member and an assembly retainer. The cup member has a radial portion formed in an inward arcuate frustoconical section defining an opening which encircles the shaft in closely spaced relation with a concavity of cup adapted to face the high interior pressure of the housing. The annular resilient plastic washers are supported such that high interior pressures during operation of the pump are operative to force the washers into layered conformity with the concavity of the outer cup section, while lubricant-containing capillary means are provided intermediate the washers.

4 Claims, 6 Drawing Figures

HIGH PRESSURE SHAFT SEALS

This invention relates to shaft seals and more particularly to a new and improved high pressure shaft seal assembly to insure continuous lubrication between the inner edges of the plastic washers and the shaft.

Rotary shaft seals, particularly for refrigerant compressors, have generally been costly requiring high smoothness and flatness. Shaft seals incorporating a plurality of flat annular plastic washers made from material such as Teflon, which are clamped into an annular case for use in preventing leakage around rotating shafts and like members where pressures are low or the sliding frictional speed is minimal, have been disclosed in prior art patents including those of U.S. Pat. No. 3,801,114 to Bentley and U.S. Pat. No. 3,572,732 to Sekulich. These patents teach a multiple elastomeric barrier or lip seal between spaced relatively moving surfaces such as rotable shafts in hydraulic pumps. Shaft sealing devices, however, for use with mechanical members such as refrigerant compressors subject to relatively sliding surfaces must withstand combinations of rapid speed and high differential pressures.

It is the object of the present invention to provide a high pressure low-loss sealing structure incorporating a plurality of plastic washers retained in a sealing structure having a radial portion formed in an inward arcuate concave frustoconical section defining an opening which surrounds and closely approaches a rotating shaft with the concavity of the outer cup section adapted to face the high interior pressure so that during operation of the compressor the pressure differential is operative to force the washers into layered conformity with the concavity of the outer cup section such that the inner multiple lip edges are in aligned sealing engagement with the shaft.

It is another object of the present invention to provide an improved high pressure multiple lip shaft seal assembly including a plurality of plastic washers supported in a structure having inward arcuate concave frustoconical section, wherein means including a bank of lubricant containing capillary passage means are provided intermediate to and/or incorporated with the washers whereby lubricant stored in the passage means is available for substantially instant lubrication of the shaft upon start-up of the shaft to obviate rapid frictional wear of the seal.

It is another object of the invention to provide a high pressure shaft seal that can be manufactured from simple punch press and die-cut or lathe cut parts assembled in a low-loss seal assembly requiring no special seat except a smooth portion of the shaft itself, whereby it can be used in any air, gas or refrigerant compressor either commercial or domestic.

Further objects and advantages of the present invention will be apparent from the following description, reference being had to the accompanying drawings wherein a preferred embodiment of the present invention is clearly shown.

Figure 1:
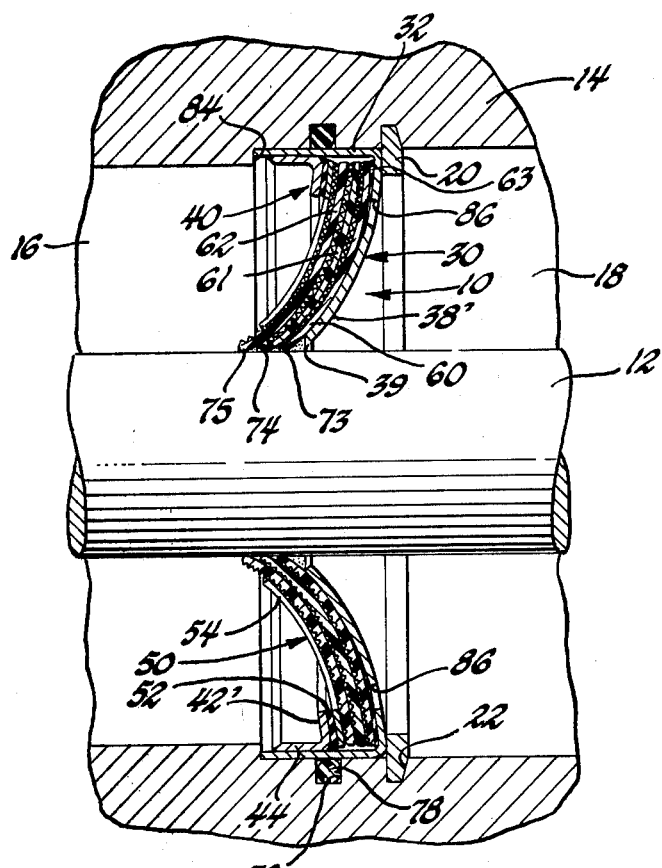
FIG. 1 is a view in partial cross section, of one embodiment of the multiple lip elastomeric seal in combination with a shaft and housing.

Referring now more particularly to the drawings, in FIGS. 1-4 there is shown a first embodiment of applicant's high pressure shaft seal assembly 10 for relatively movable parts in the form of a shaft 12 and a housing 14. Between the relatively movable shaft and housing, an inner gap 16 in the form of an annular space is defined, which gap is filled with the fluid desired to be retained by the seal. In one form of the invention the shaft seal 10 could be used with a refrigerant compressor wherein the compressor interior would be on the left-hand side of the seal assembly indicated by inner gap 16, while the right-hand counterbored annular space 18 is the side of the seal assembly 10 that is exposed to atmospheric pressure. The high pressure seal assembly 10 is retained with respect to the atmospheric pressure side of the compressor housing by means of a suitable outer retaining means such as a C-spring retainer 20 located in an annular groove 22 within the circular counterbore 18.

Figure 2:
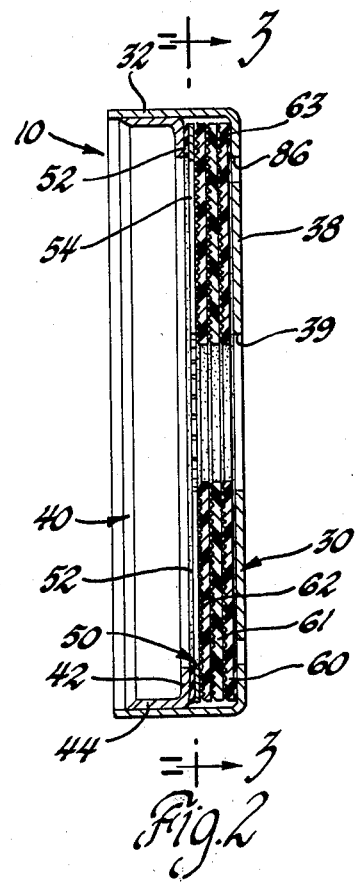
FIG. 2 is a view of the shaft seal assembly of FIG. 1 prior to its being inserted into a shaft bore by means of a punch-press operation.

As seen in FIGS. 1 and 2, the seal assembly 10 is generally annular and cup-shaped as shown. The element 30 is an outer cup having a cylindrical bore-engaging portion 32 into which an inner annular sectioned ring 40 telescopes. The outer cup 30 has an outer radial flange portion 38 initially formed at substantially right angles to cylindrical portion 32, as shown in FIG. 2. Upon final assembly the outer cup 30 has an inward arcuate concave frustoconical section 38' (FIG. 1) defining a circular central opening 39 dimensioned so as to surround and closely approach the surface of shaft 12. It will be noted that the concavity of the outer cup flange section 38' is adapted to face the high pressure interior bore or gap 16 of the compressor area.

The inner retainer ring 40 is fixedly telescoped within the outer cup 30 with the inner ring having an inner radial flange 42 which flange is also initially formed (FIG. 2) at substantially right angles to its cylindrical portion 44. Upon final assembly (FIG. 1) the radial flange, designated at 42', is formed in a slightly inward arcuate or angled manner in conformity with the peripheral region of outer cup flange 38'. A resilient disc-shaped member 50 is positioned on the inner side of the radial flange 42 and is sealed thereto at 52 by a suitable sealing material. The disc 50 has a plurality of radial slits 54 formed therein which extend inwardly to circular aperture 56 to provide a plurality of resilient spring fingers 58.

Located intermediate the radial flange 38' of the outer cup 30 and the resilient disc member 50 are a plurality of substantially identical annular resilient plastic sealing members or washers sandwiched therebetween. In the preferred form the seal assembly has three washers 60, 61 and 62 with the washer 60 sealed to cap flange 38' at 63 by a suitable sealing material.

The plastic sealing washers 60-62 can be of any plastic having an extendability of at least 200 percent. The washers could be made from filled or unfilled plastic providing low gas transmission rates from the fluoroplastics such as TFE and TEP Teflon, Halon, etc. It will be noted, however, that other plastic material such as Nylon, ultra high molecular weight polyethylene or polyesters such as Valox, Dalar, etc. are also contemplated. In the preferred embodiment material for a refrigerant compressor application, the plastic washers should be made from TFE Teflon, 10 to 20% filled with graphite carbon or molybdenum or tungsten sulfides or similar solid lubricants, in thickest ranges of 0.025 to 0.060 inches. Such plastic washers can be inexpensively produced by molding precision hollow cylinders and lathe cutting the washers therefrom to the desired thickness.

In the preferred embodiment of the seal assembly 10 the outer cup 30 is initially formed as round flat-bottomed cup with the ring flange 42 conforming thereto. The plastic washers 60-62 and the resilient disc 50 are then assembled and hermetically or leak-free retained by a suitable sealing compound used to seal between the outer cup radial flange 38 and the first plastic washer 60. After assembling the outer cup 30, inner ring 40, discs 50 and washers 60-62 as shown in FIG. 2, the assembly is formed as by punch pressing to the shape shown in FIG. 1.

The cupping of the seal assembly into the form shown in FIG. 1 results in nested, movable cone-shaped plastic washers 60-62 wherein their inner peripheries 70, 71 and 72 define sealing edges 73, 74 and 75 which conform and instantly follow the smooth shaft 12 as a result of the refrigerant gas pressure in gap 16 constantly holding and pressing the washer edges 73, 74 and 75 to the shaft 12. It will be noted that the seal 10 may be assembled with one, two, three or any desired multiple of the plastic washers so as to follow various shaft eccentricities.

An important feature of applicant's invention involves providing capillary lubrication means in the form of a thin labyrinth of capillary spaces or channels in combination with the sealing washers operative to acquire and hold or bank lubricant for smooth, low friction functioning of the washer inner edges 73-75 against the smooth shaft 12. This is especially critical for cyclical start-ups in applications of the seal assembly with refrigerant compressors. While both high and low pressure sides or faces of the seal washers 60-62 could be provided with capillary means, the high pressure gap or bore side 16, opposite the washer inner sealing edges 73-75 is sufficient. In the embodiment of FIGS. 1-4 the lubricant-containing capillary channel means is attained by forming a continuous spiral groove 76 on the inner high pressure face of each washer, which groove 76 extends continuously from the washer outer periphery to its inner periphery.

Various methods of mass producing the washers are contemplated. One suitable means involves lathe cutting the spiral groove 76 as with a sharp V-pointed tool, for example, on the end surfaces of an annular Teflon molded bar. In this way a smooth peripheral surface and sharp contacting internal diameter sealing edge 73-75 is generated for the next succeeding washer. It should be noted that the sealing washers could also be manufactured from a solid pre-molded bar with the inner periphery central opening then die cut. The particular method selected for manufacture of the washers will depend upon the cutting properties of the elastomeric plastic and solid lubricant filler employed. The depth of the spiral V-sectioned groove 76 may extend over a range of dimensions depending upon the specific application and washer thickness used with the V-sectioned groove 76 of the preferred embodiment having a depth of the order of 0.005 to 0.020 inches.

Figure 3:
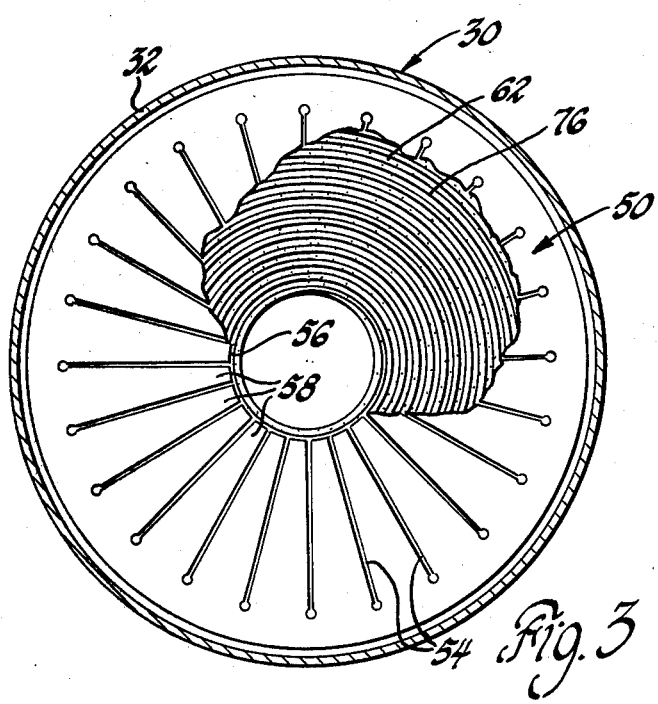
FIG. 3 is an enlarged cross-sectional view, with parts broken away, taken on the line 3—3 of FIG. 2.
Figure 4:
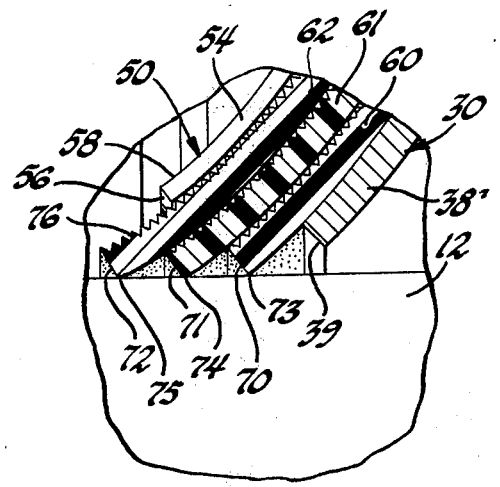
FIG. 4 is an enlarged fragmentary sectional view of the seal showing the multiple lip contact pattern with the shaft.

With reference to the resilient spring finger disc 50, as best seen in FIG. 3 the disc is originally a flat spring steel disc, having a plurality of radial slits 54 to provide a plurality of individual fingers 58 which in the preferred embodiment number 32, although lesser or greater numbers may also be used. The prime purpose of the resilient disc is to retain and hold the plastic sealing washers 60-62 into sealing condition when the internal pressure of the compressor drops below atmospheric pressure. It will be noted that the spring disc 50 does not form or flow during the cupping process but rather bends or springs to conform generally to the resulting concavo-convex curve of the washers and radial flange 38' and thus exerts a continual back or biasing pressure on the plastic washers.

Assembling the inner retainer ring 40 is achieved by means of a press or frictional engagement fit into the outer cup 30 to permanently retain the washers and disc 50 in a hermetically sealed manner. In the preferred form serrations 41 on the ring face and in the cup face are used to give a permanent grip therebetween. The holding of the seal assembly in place is accomplished with a standard O-ring 78 located in an internal annular groove 79 to insure a sealed fit between the seal assembly in the bore.

With regard to the insertion of the seal assembly over the shaft 12, preferably a tubular implement is used which extends the internal lip diameters of the sealing washers so that they are slightly larger than the shaft diameter. A simple push will then seat the seal assembly against the bore positioning shoulder 84. Removal of the seal for replacement will be simply accomplished by inserting a suitable tool into face slots 86 and pulling axially on the sealing assembly toward the left hand or outer portion of the housing.

Figure 5:
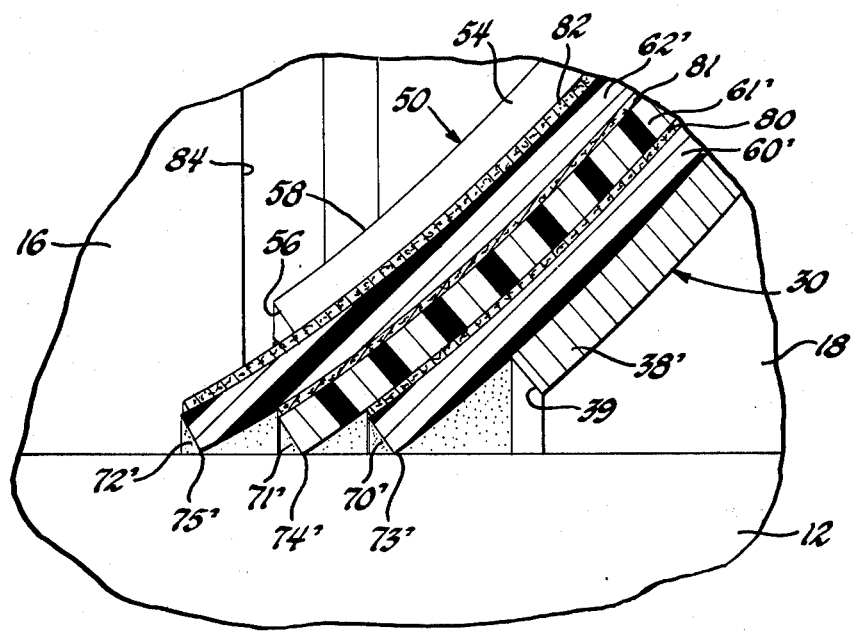
FIG. 5 is an enlarged partial radial cross section of another embodiment of the seal shown in FIG. 1.
Figure 6:
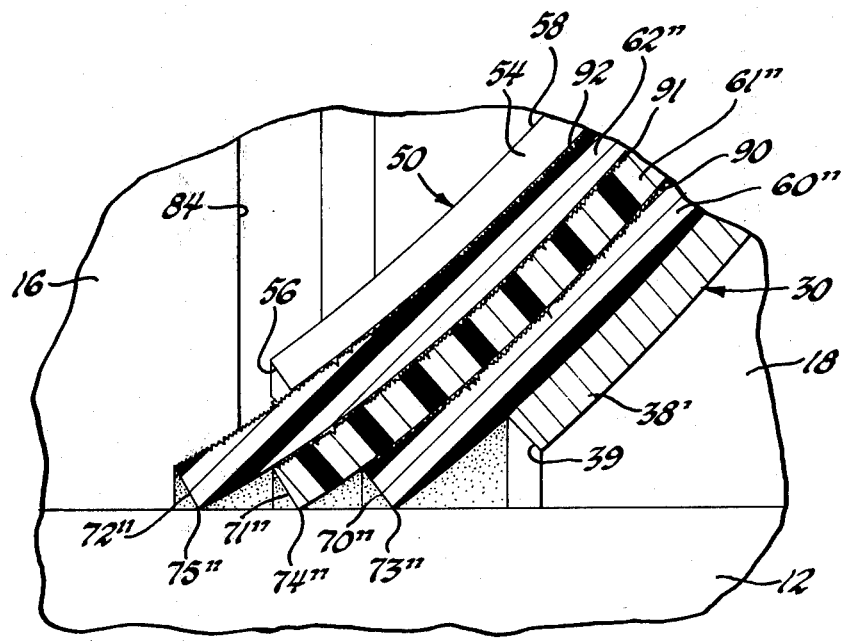
FIG. 6 is an enlarged partial radial cross-section of another embodiment of the seal shown in FIG. 1.

Turning now to the form of the invention shown in FIGS. 5 and 6, the same reference numerals have been used to designate corresponding elements and unless otherwise indicated the elements shown in FIGS. 5 and 6 function in the same manner as the corresponding elements shown in FIGS. 1–4.

In FIG. 5 a modified self-lubricating system is provided for retaining the lubricating oil for delivery to the contacting seal edges 73'-75' by separating the seal washers, indicated by single primes 60'-62', with discs 80, 81 and 82 formed of suitable porous cellulose fibrous paper-like material having inherent capillarity. It should be noted, however, that for specific applications, such as high temperature operation requiring long life, it may be necessary to provide washers made from other material such as synthetic paper, felts of polymer, fine wire, etc. The discs 80-82 preferably have a thickness of the order of 0.003 to 0.020 inches to provide adequate lubricant reservoirs for the application of compressor shaft seals. In the case of discs 80-82 being formed from cellulosic paper, felt or the like, the invention encompasses fibrous discs being pre-impregnated with a resin to stabilize the material's porous or open capillary structure. An example of one type of material would be phenolic resin filter paper of the type used in automotive oil filters.

Turning now to the embodiment of the invention shown in FIG. 6, applicant provides oil retaining integral capillary means for modified Teflon washers, indicated by double primes 60"-62" by roughing one surface or face of the washers as shown at 90-92, respectively. One method of producing the capillary surfaces 90-92 involves roughing the end face of a solid bar of resilient plastic material, such as Teflon, by means of a coarse grinding wheel or wire brush wheel. It will be noted that the depth of roughness of the capillary means of faces 90-92 is less than the spiral grooves 76 of the embodiment of FIGS. 1-4, i.e. of the order of 200 to 1,000 micro-inches.

By virtue of applicant's shaft seal assembly incorporating oil retention self-lubricating capillary means for the sealing washers, a high pressure seal is achieved resulting in reliable long life seal operation for various shaft seal applications such as refrigerant compressors. Without the provision of applicant's self-lubricating means for insuring that an oil film is continuously and instantly present on a compressor shaft during cyclical start-ups, under low temperature conditions, the sealing edge portion of the washer contacting the shaft will be thermally shocked resulting in roughened, blistered or disintegrated seal edges, such as edges 73-75, in a time span measured in miliseconds.

It will be further noted that applicant's novel high pressure seal assembly 10 is operative in a refrigerant compressor application to retain traces of lubricating oil in the washer capillary spaces, and thus provides an oil film on the shaft 12 thereby avoiding the pumping of oil or air back into the refrigerating system.

While the embodiment of the present invention as herein disclosed constitutes a preferred form it is to be understood that other forms might be adopted.

I claim:

1. In an improved shaft seal for separating the high interior and low exterior pressures of a refrigerant compressor, the combination of a wall assembly comprising a wall having a circular bore, a shaft member passing through said bore so as to be aligned on the axis thereof, an axially stationary bore-engaging outer cup, means sealing said cup in said bore, a retainer ring fixedly telescoped within said outer cup, said outer cup having a radial portion formed in an inward arcuate concave frustoconical section defining an opening which surrounds and closely approaches said shaft, the concavity of said outer cup section adapted to face the high interior pressure of said compressor, a plurality of substantially identical annular resilient plastic washers sandwiched between said outer cup and said retainer ring so that high interior pressure during operation of the compressor is operative to force said washers into layered conformity with the concavity of said outer cup section such that an inner edge of each washer is positioned in line-sealing engagement with said shaft, a resilient disc member on the high interior pressure side of said washers having integral radial spring fingers conforming to the concavity of said outer cup section and pressing said washer toward said outer cup section thereby to substantially maintain said layered conformity of said washers irrespective of said interior pressures when the compressor is not operating, and means including a bank of lubricant-containing capillary channels intermediate said washers whereby lubricant stored in said channels is available for substantially instant lubrication of said shaft upon start-up of said compressor, and whereby lubricant removed by high pressure-induced leakage past the inner edges of said washers may be replaced by lubricant moving from the capillary channels toward the shaft to insure continuous lubrication between said inner edges and said shaft during operation of the compressor.

2. In an improved shaft seal for separating the high interior and low exterior pressures of a refrigerant compressor, the combination of a wall assembly comprising a wall having a circular bore, a shaft member passing through said bore so as to be aligned on the axis thereof, an axially stationary bore-engaging outer cup, means sealing said cup in said bore, a retainer ring fixedly telescoped within said outer cup, said outer cup having a radial portion formed in an inward arcuate concave frustoconical section defining an opening which surrounds and closely approaches said shaft, the concavity of said outer cup section adapted to face the high interior pressure of said compressor, a plurality of substantially identical annular resilient plastic washers sandwiched between said outer cup and said retainer ring so that high interior pressure during operation of the compressor is operative to force said washers into layered conformity with the concavity of said outer cup section, each said washer having concentric inner and outer circular peripheries, each said washer inner periphery having an edge positioned in line-sealing engagement with said shaft, a resilient disc member on the high interior pressure side of said washers having integral radial spring fingers conforming to the concavity of said outer cup section and pressing said washer toward said outer cup section thereby to substantially maintain said layered conformity of said washers irrespective of said interior pressures when the compressor is not operating, and means including lubricant-containing capillary means on said washers whereby lubricant stores in said capillary means is available for substantially instant lubrication of said shaft upon start-up of said compressor, said capillary means in the form of a spiral groove on one side face of each said washer extending continuously from the washer outer periphery to its inner periphery, and whereby lubricant removed by high pressure-induced leakage past the inner sealing edges of said washers may be replaced by lubricant moving from the capillary spiral groove toward the shaft to insure continuous lubrication between said inner edges and said shaft during operation of the compressor.

3. In an improved shaft seal for separating the high interior and low exterior pressures of a refrigerant compressor, the combination of a wall assembly comprising a wall having a circular bore, a shaft member passing through said bore so as to be aligned on the axis thereof, an axially stationary bore-engaging outer cup, means sealing said cup in said bore, a retainer ring fixedly telescoped within said outer cup, said outer cup having a radial portion formed in an inward arcuate concave frustoconical section defining an opening which surrounds and closely approaches said shaft, the concavity of said outer cup section adapted to face the high interior pressure of said compressor, a plurality of substantially identical annular resilient plastic washers sandwiched between said outer cup and said retainer ring so that high interior pressure during operation of the compressor is operative to force said washers into layered conformity with the concavity of said outer cup section, each said washer having inner and outer peripheries, each said washer inner periphery having an edge positioned in line-sealing engagement with said shaft, a resilient disc member on the high interior pressure side of said washers having integral radial spring fingers conforming to the concavity of said outer cup section and pressing said washer toward said outer cup section thereby to substantially maintain said layered conformity of said washers irrespective of said interior pressures when the compressor is not operating, and means including lubricant-containing capillary means intermediate said washers whereby lubricant stored in said capillary means is available for substantially instant lubrication of said shaft upon start-up of said compressor, said capillary means in the form of a disc positioned in coextensive laminar relation with each said washer, each said disc formed of porous material having inherent capillarity, and whereby lubricant removed by high pressure-induced leakage past the inner edges of said washers may be replaced by lubricant moving from said discs toward the shaft to insure continuous lubrication between said inner edges and said shaft during operation of the compressor.

4. In an improved shaft seal for separating the high interior and low exterior pressures of a refrigerant compressor, the combination of a wall assembly comprising a wall having a circular bore, a shaft member passing through said bore so as to be aligned on the axis thereof, an axially stationary bore-engaging outer cup, means sealing said cup in said bore, a retainer ring fixedly telescoped within said outer cup, said outer cup having a radial portion formed in an inward arcuate concave frustoconical section defining an opening which surrounds and closely approaches said shaft, the concavity of said outer cup section adapted to face the high interior pressure of said compressor, a plurality of substantially identical annular resilient plastic washers sandwiched between said outer cup and said retainer ring so that high interior pressure during operation of the compressor is operative to force said washers into layered conformity with the concavity of said outer cup section, each said washer having inner and outer peripheries, each said washer inner periphery having an edge positioned in line-sealing engagement with said shaft, a resilient disc member on the high interior pressure side of said washers having integral radial spring fingers conforming to the concavity of said outer cup section and pressing said washer toward said outer cup section thereby to substantially maintain said layered conformity of said washers irrespective of said interior pressures when the compressor is not operating, and means including a bank of lubricant-containing capillary means intermediate said washers whereby lubricant stored in said capillary means is available for substantially instant lubrication of said shaft upon start-up of said compressor, said capillary means in the form of a roughened surface formed on one face of each said washer providing connecting capillary channels extending coextensive with the washer face having a depth of the order of 200 to 1,000 micro-inches, and whereby lubricant removed by high pressure-induced leakage past the inner edges of said washers may be replaced by lubricant moving from the washer capillary channels toward the shaft to insure continuous lubrication between said inner edges and said shaft during operation of the compressor.

* * * * *